Figure 1:
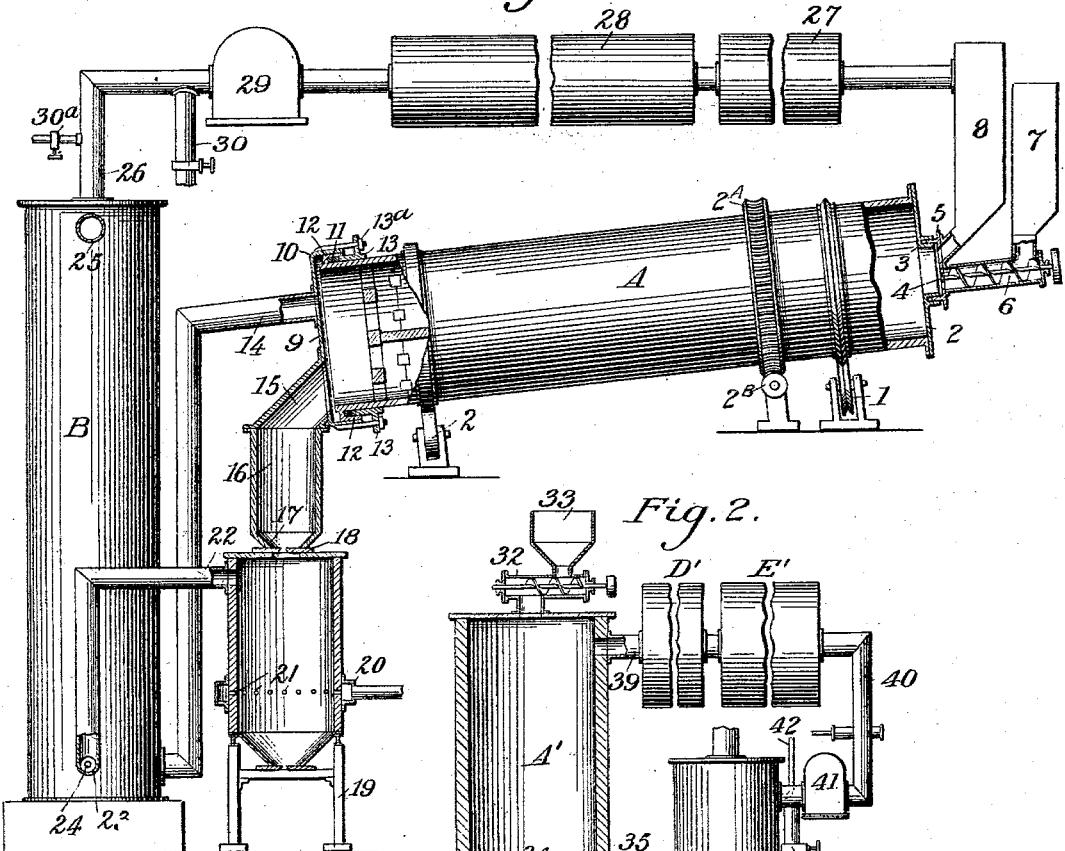

No. 753,294. PATENTED MAR. 1, 1904.
P. NAEF.
METHOD OF PRODUCING GAS.
APPLICATION FILED MAR. 14, 1899.
NO MODEL.

Witnesses:
G. F. Downing
S. G. Nottingham

Inventor:
Paul Naef
By H. A. Seymour
Attorney.

No. 753,294.

Patented March 1, 1904.

UNITED STATES PATENT OFFICE.

PAUL NAEF, OF NEW YORK, N. Y.

METHOD OF PRODUCING GAS.

SPECIFICATION forming part of Letters Patent No. 753,294, dated March 1, 1904.

Application filed March 14, 1899. Serial No. 709,100. (No specimens.)

*To all whom it may concern:*

Be it known that I, PAUL NAEF, Ph.D., chemical engineer, a citizen of Switzerland, and a resident of 132 Woody Crest avenue, New York, in the county of New York and State of New York, have invented certain new and useful Improvements in Methods of Producing Gas and By-Products, of which the following is a specification.

The invention relates to the manufacture of water-gas from fuel by the action of steam.

Objects of the invention are to make the production of water-gas a continuous operation; to enable the use of bituminous fuel in the production of water-gas; to enable the recovery of more of the nitrogen contained in the fuel as ammonia; to recover tar from the fuel, if desired; to produce a water-gas containing some illuminating-hydrocarbons; to devise an improved system for heating fuel before it is treated for the production of water-gas; to increase the production of water-gas per ton of fuel; to devise a novel system of supplying heat.

The process consists in heating a mixture of water-gas or another combustible gas containing no nitrogen and steam to a high temperature and conducting the highly-heated mixture through a column of fuel. Any preferred construction of heater may be employed.

Instead of using the heaters for heating air they are in the present invention used for heating a mixture of water-gas and steam. The heaters are first heated up by combustion of producer-gas. Afterward the mixture of water-gas and steam is forced through, which leaves the heaters in a highly-heated state. By using two or more heaters alternately a continuous stream of heater-gas is obtained, which is conducted through the water-gas generator. This generator can consist of a shaft with suitable fuel-feed on top, suitable inlets for the hot gas, and an outlet for the gas after it has passed the column of fuel. The apparatus is so constructed that the hot mixture of water-gas and steam has to pass a column of fuel of considerable height, so as to allow sufficient time for the reaction and to bring the mixture of gas and steam into intimate contact with the fuel. The apparatus is, further, made of greater height and greater diameter than ordinary water-gas plants for the purpose of intercepting the heat as much as possible from the gases before they leave the apparatus.

Bituminous fuel can be used in the process, and the amount of steam admixed to the water-gas can be so chosen that the heat contained in the heated mixture is sufficient to decompose most of the steam and to effect destructive distillation of the volatile matter of the coal in the upper part of the apparatus. The process is continuous. Water-gas free from nitrogen and containing ammonia and tar leaves the apparatus and is conducted through suitable washing plants for the recovery of ammonia. The gas leaving the apparatus contains not only the ammonia formed during the distillation of the coal, but also the ammonia formed during the action of the steam on the coke. As this reaction $$(C+H_2O=CO+H_2)$$

takes place in an atmosphere of water-gas and steam, decomposition of ammonia is practically excluded, and nearly the whole amount of nitrogen is converted into ammonia. After the gas from the apparatus has been conducted through a suitable ammonia-recovery plant a large amount is again returned to the heaters by means of a pump and is again forced through the generator. There is thus obtained a continuous circulation of water-gas through the coking plant, recovery plant, and heaters, and only the surplus gas produced is conducted to a gas-holder. During the passage of the gas from recovery plant to heaters a regulated amount of steam is continuously mixed with the gas. For the purpose of raising the temperature in the heaters as much as possible it is of advantage to supply the producer-gas to them as hot as possible and also to heat the air required for burning this gas.

If anthracite or coke is used in the process, or if the recovery of ammonia is not desired, the process is modified as follows: In this case a large excess of steam is used, and the gas is returned to the heaters by means of a blower or other suitable means without previously cooling and washing the gas. The surplus of gas is drawn off for use. As the specific heat of steam is higher than that of water-gas, more heat is taken up during the passage through the heater and more water-gas is afterward formed during every passage through the generator.

Figure 2:
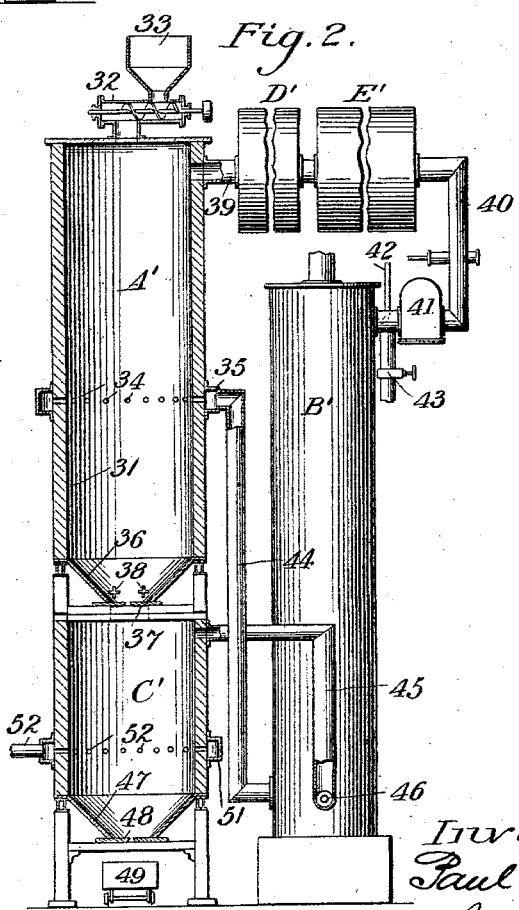

In the drawings, Figure 1 shows a vertical section of an apparatus for carrying out the process, consisting of a heater and revolving furnace. Fig. 2 is a vertical section of an apparatus for carrying out the process, consisting of a vertical generator and a heater.

In Fig. 1, A is a revolving furnace, preferably as shown in my Patent No. 596,533 of January 4, 1898. In the drawings it is shown supported by a V-roller 1 and a roller 2 and driven by rock-circle $2^a$ and worm $2^b$. In the interior it has partitions for the purpose of lifting the material. The higher end of the cylinder is closed by a plate having a central opening and a projecting flange 3. Over this flange fits loosely a stationary plate 4 with a flange 5. The space between flanges 3 and 5 is filled with a suitable packing, and by adjusting the distance of the end plate and the stationary plate 4 a tight joint is obtained. In the plate 4 are two openings. One is in connection with the fuel-feed, consisting of the conveyer 6, which feeds fuel from hopper 7. The other opening is in connection with a dust-chamber 8, which is so arranged that the dust is returned to the furnace automatically. The lower end of the furnace is closed by the stationary end plate 9, which has a flange 10, which fits loosely over the end of the cylinder. The space between this flange and the cylinder A is filled with a suitable packing 11, which is held in position by a ring 12, fastened or cast around the cylinder A, and an adjustable ring 13. The latter is preferably arranged in section and is adjustable by means of bolts $13^a$, fastened to border 10 of end plate 9, and a tight joint is obtained. The end plate 9 has two openings. Through one connects the hot-gas pipe 14, which conducts air from heater B. The other is for the discharge of the consumed material. It connects by means of an outlet 15 to the hopper 16. The latter has a conical bottom 17 and doors 18 at the base thereof. For the purpose of distributing the hot gas and for keeping some of the fuel in the furnace there is arranged a perforated wall $17^a$. Below the hopper 16 is a gas-producer C for the production of gas for the purpose of heating the gas heating-stoves. The gas-producer C is erected on columns 19. It has a conical bottom and doors for withdrawal of the cinders. The air is introduced through an annular channel 20 and the ducts 21. The producer-gas leaves through pipe 22. The gas-heater B is only shown in outline. It is preferably of the continuous type. The gas from the producer enters at 23 and is burned with air introduced through the central pipe 24. The exit of the gases of combustion is at 25. The cool gases enter the heater through pipe 26, and the hot gases leave through pipe 14. After having passed the cylinder they leave through dust-chamber 8 and enter a cooler of any suitable type 27. Then they pass through any suitable washing plant 28, as indicated, and afterward through the blower 29. Part of the gases passes back to the heater after addition of steam through pipe $30^a$. The rest is conducted to a gas-holder through pipe 30. If anthracite is used, cooler 27 and washer 28 are unnecessary, and the gas passes directly back to the heater. Some ammonia can be recovered without using the cooler 27 and washer 28 by conducting the gas drawn off at 30 through a washing plant. Such a washing plant could be of much smaller size.

The apparatus shown in Fig. 2 consists of the water-gas generator A', gas-heater B', gas-producer C', cooler D', and washer E'. The water-gas generator A' consists of a vertical shaft 31, with a suitable fuel-feed on top, consisting in this case of a conveyer 32 and a hopper 33. It has a series of ducts 34 for hot gas at such a height that the resistance of the gas in an upward and downward direction is about the same. The annular channel 35 leads the gas to the ducts 34. At the bottom the generator for water-gas has a conical bottom 36 and sliding doors 37, also discharging-rollers 38. Near the top it has an outlet-pipe 39, which leads to a cooler D' of any suitable construction. From the cooler D' the gas passes to a washer E' and through pipe 40 to the suction-fan 41, which delivers some of the gas back to the heater B after addition of steam through pipe 42. The rest of the gas is conducted to a gas-holder through pipe 43. The heater B can be of any suitable construction. It is shown with an outlet-pipe 44 for hot gas, which connects with the water-gas generator A'. It is heated by gas supplied from gas-producer C' through pipe 45. Any source of gas may be used to start the process. Heated combustion-gas can be used, which may be mixed with steam and introduced into the fuel to start the operation. The gas is burned by air entering through the central pipe 46, and the combustion-gases leave through pipe 47. The gas-producer C' has a conical bottom 47, closed with sliding doors 48, and is so arranged that the cinders can be withdrawn into wagons 49. Air is forced through pipe 50 into the annular channel 51 and enters by the ducts 52. The producer-gas leaves the producer through pipe 45.

The operation of the apparatus shown in Fig. 1 is as follows: Fuel is continuously charged into the revolving cylinder, and the consumed material discharges itself into the hopper, from which it is from time to time emptied into the producer by means of opening the doors. Air is blown into the producer from a blower (not shown) through the annular channel and the ducts. The producer-gas is conducted to the heater B, where it is burned with air entering through pipe 24 and which is preferably previously heated. The gases of combustion leave at 25. The mixture of water-gas and steam enters the heater through pipe 26 and leaves in a highly-heated state through pipe 14, which conducts it into the revolving furnace A. Here water-gas is formed by the reaction $C + H_2O = CO + H_2$, and if bituminous coal is used it is distilled near the charge end of the furnace. At the same time ammonia and tar are formed, which are suspended in the gas as vapor. The gas leaving the furnace enters the dust-chamber 8, which has an inclined bottom, so that the dust falls back into the furnace. It then enters the cooler 27 and the by-products recovery plant 28 and passes through the fan 29. Some gas returns to heater B and is continuously mixed with steam. The rest of the gas is conducted to a gas-holder through pipe 30 or is passed to a carbureting plant. As previously stated, the cooler and recovery plant are not necessary if no by-products are to be recovered.

It is of advantage to use a furnace which will break up the fuel and expose it finely to the action of the steam. Such a result is obtained by using the perforated partitions shown in my Patent No. 596,533, January 4, 1898. The perforated wall near the discharge end of the revolving furnace causes a good distribution of hot gas. It also keeps back the larger pieces of coke. If the fuel is to be burned to ash in the revolving furnace, this partition-wall is made with small openings, so that only fine cinders are discharged. The arrangement of the end plate on the discharge end of the furnace is of importance, as it insures a tight joint. By moving the adjustable ring 13 the packing can be replaced in a very short time. For the purpose of avoiding the risk of leakage a small pressure is maintained in the apparatus. The use of the hopper 16, closing tightly against the end plate, has the advantage that the furnace can be worked continuously, and the material can be withdrawn periodically from the hopper without leakage. The use of the producer below the hopper results in economy of fuel and labor. By discharging a material into the gas-producer containing combustible matter the efficiency of the water-gas plant is increased, and if bituminous fuel is used ammonia and tar and hydrocarbons will be recovered from the fuel which is necessary to heat the gas-heaters.

The operation of the apparatus shown in Fig. 2 has been described. Fuel is fed into the water-gas generator A', and the partly-burned material is emptied into the gas-producer C', from which cinders are withdrawn at the bottom. By means of the mechanical discharging arrangement at the base of the generator and at the base of the producer the passage of the fuel can be made entirely automatic and continuous both through water-gas generator and gas-producer. Air is forced into the gas-producer from a blower (not shown) through pipe 50 and the annular channel 51 and ducts 52. The producer-gas is conducted to the heater through pipe 45 and is burned by means of air entering through the central pipe 46. The gases of combustion leave the heater through pipe 47. The mixture of gas and steam enter the heater through pipe 40 and passes in a highly-heated state into the generator A' through the annular channel 35 and ducts 34. Passing upward through the fuel water-gas is formed, and if bituminous fuel is used distillation takes place in the upper part of the generator. It is of importance that the gas enter the generator at such a height that it will pass upward through the fine fuel, the resistance upward and downward being about the same. From the generator the gas passes through the cooler D' and the washer E', which may be of any suitable construction. As a cooler I prefer a chamber containing a number of iron pipes. The gas passes through the chamber, and the air used for burning the producer-gas in the heater is passed through the pipes. In this way a higher temperature is produced in the heater, and fuel is economized. After the washer E' the gas passes a fan 41, and part of it is returned to the heater B' through pipe 40, steam being added through pipe 42. The surplus gas is withdrawn for carburation or conducted to a gas-holder through pipe 43. If no by-products are to be recovered, no cooler and by-product plant are used. If bituminous fuel is used, the water-gas contains hydrocarbons, and ammonia is produced from the fuel turned into water-gas, as well as from the fuel necessary for heating the heaters. As previously explained, the process is hastened by working it in such a way that a gas containing an excess of steam leaves the generator. As the specific heat of steam is higher than that of the gas, more heat is taken up in the heater and more water-gas is formed during the passage through the fuel. For the purpose of further hastening the formation of water-gas I heat the fuel before the mixture of steam and gas is passed through it. This can be conveniently done by injecting air periodically into the fuel, as practiced in the ordinary water-gas processes in use. The fuel-gas thus produced is with advantage used for the purpose of heating the heaters. A great improvement can be effected in already-existing water-gas plants by heating the steam used in the process in one of the heaters. Much greater still is the advantage of circulating a mixture of steam and gas through the generator, as described, during the water-gas run. Much longer water-gas runs will then be possible, and bituminous fuel can be used and by-products recovered. If the fuel is heated, as described, by periodically injecting air, the same apparatus can be used as in the drawings by providing suitable inlets for injecting air and outlets for withdrawing the dilute gas produced during the air-blowing period and by providing suitable valves in said inlet and outlet and also in the inlet and outlet pipe for the water-gas.

The mode of heating the gas is not limited to the use of the heaters described. If the gas is not returned to the generator in continuous circulation, gas and steam can be heated separately. The gas can then be heated by conducting it through a body of fuel periodically heated by the injection of air. If revolving furnaces are used for carrying out the process, there is also the advantage that practically no resistance is offered to the passage of the gas. Any suitable form of a continuous heater can then be employed.

The construction of the apparatus may be varied as the case may require to effect the best results without departing from the spirit of the invention.

I do not in this case claim the features of construction of apparatus, as the same is reserved to constitute the subject of a separate application.

Having thus described my invention, what I claim as new, and wish to secure by Letters Patent, is—

1. The method of producing water-gas containing illuminating-hydrocarbons from bituminous fuel, which consists in first coking the fuel by continuously conducting heated water-gas through the same, second, removing by-products from the resultant gases, third, heating the water-gas and utilizing it in the first operation.

2. The continuous process, consisting in passing a heated mixture of gas and steam through a column of fuel, washing the gaseous resultant product to recover by-products, repeatedly reheating and repassing part of the washed gas through the fuel and mixing steam with it after each passage through the fuel, conducting the remaining portion of said washed gas to the point of utilization, and utilizing the refuse fuel for supplying heat required for heating the gas during the process.

Signed at New York, in the county of New York and State of New York, this 13th day of March, A. D. 1899.

PAUL NAEF.

Witnesses:
W. E. BROWER,
SAMUEL W. ROMAIN.